United States Patent
Shavell

(10) Patent No.: US 9,735,965 B1
(45) Date of Patent: Aug. 15, 2017

(54) SYSTEMS AND METHODS FOR PROTECTING NOTIFICATION MESSAGES

(71) Applicant: Symantec Corporation, Mountain View, CA (US)

(72) Inventor: Michael Shavell, Merrimack, NH (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/687,941

(22) Filed: Apr. 16, 2015

(51) Int. Cl.
*H04L 29/06* (2006.01)
*H04L 9/32* (2006.01)

(52) U.S. Cl.
CPC .......... *H04L 9/3236* (2013.01); *H04L 9/3242* (2013.01); *H04L 9/3263* (2013.01)

(58) Field of Classification Search
CPC ....... H04L 9/32; H04L 9/3236; H04L 9/3242; H04L 9/3263
USPC ........................................................ 713/170
See application file for complete search history.

(56) References Cited

U.S. PATENT DOCUMENTS

| | | | |
|---|---|---|---|
| 7,188,214 B1 | 3/2007 | Kasriel et al. | |
| 8,516,193 B1 | 8/2013 | Clinton et al. | |
| 2005/0055437 A1* | 3/2005 | Burckart ........... | G06F 17/30949 709/224 |
| 2005/0081039 A1* | 4/2005 | Lee ...................... | H04L 63/045 713/176 |
| 2005/0114711 A1 | 5/2005 | Hesselink et al. | |
| 2005/0223163 A1 | 10/2005 | Ogasawara et al. | |
| 2006/0072721 A1 | 4/2006 | Wisniewski | |
| 2007/0160030 A1 | 7/2007 | Cruz | |
| 2008/0127339 A1* | 5/2008 | Swain .................. | H04L 12/585 726/22 |
| 2008/0225862 A1 | 9/2008 | Wartenberg | |
| 2009/0006641 A1 | 1/2009 | Yaqoob et al. | |
| 2009/0031128 A1* | 1/2009 | French ............... | G06F 21/6218 713/164 |
| 2010/0161714 A1 | 6/2010 | Dongre | |
| 2010/0274922 A1 | 10/2010 | Reavely | |

(Continued)

OTHER PUBLICATIONS

Michael Shavell, et al; Systems and Methods for Reducing Network Traffic by Using Delta Transfers; U.S. Appl. No. 14/609,465, filed Jan. 30, 2015.

(Continued)

*Primary Examiner* — Yogesh Paliwal
(74) *Attorney, Agent, or Firm* — FisherBroyles LLP

(57) ABSTRACT

The disclosed computer-implemented method for protecting notification messages may include (1) identifying at least a portion of a notification message to be protected from modification, (2) using a hash function to calculate a hash of the portion of the notification message, (3) encrypting the hash, (4) adding the encrypted hash to the notification message, and (5) transmitting the notification message to a client that is configured to verify that the portion of the message has not been modified by (a) decrypting the encrypted hash, (b) using the hash function to recalculate the hash of the portion of the notification message, and (c) verifying that the decrypted hash is the same as the recalculated hash. Various other methods, systems, and computer-readable media are also disclosed. Various other methods, systems, and computer-readable media are also disclosed.

18 Claims, 6 Drawing Sheets

(56) References Cited

U.S. PATENT DOCUMENTS

| | | | |
|---|---|---|---|
| 2011/0265159 A1* | 10/2011 | Ronda | H04L 63/0853 726/6 |
| 2011/0311051 A1* | 12/2011 | Resch | H04L 63/06 380/270 |
| 2012/0054851 A1 | 3/2012 | Piazza et al. | |
| 2012/0131083 A1 | 5/2012 | Goddard et al. | |
| 2012/0289239 A1 | 11/2012 | Luna et al. | |
| 2012/0323990 A1* | 12/2012 | Hayworth | H04L 67/26 709/203 |
| 2013/0268673 A1 | 10/2013 | Graham-Cumming | |
| 2014/0052772 A1 | 2/2014 | Hourselt et al. | |
| 2014/0172961 A1 | 6/2014 | Clemmer et al. | |

OTHER PUBLICATIONS

"How to disable all notifications and scan progress on Symantec Endpoint Protection (SEP) 12.1 unmanaged client", https://support.symantec.com/en_US/article.TECH172737.html, as accessed Dec. 9, 2014, Article: TECH172737, Symantec Corporation, (Jul. 28, 2012).

"List of HTTP header fields", http://en.wikipedia.org/wiki/List_of_HTTP_header_fields, as accessed Dec. 9, 2014, Wikipedia, (Jul. 24, 2010).

Guzel, Burak, "HTTP Headers for Dummies", http://code.tutsplus.com/tutorials/http-headers-for-dummies--net-8039, as accessed Dec. 9, 2014, (Dec. 9, 2009).

Rouse, Margaret, "payload", http://searchsecurity.techtarget.com/definition/payload, as accessed Dec. 9, 2014, (May 18, 2011).

"What's the difference between a POST and a PUT HTTP REQUEST?", http://stackoverflow.com/questions/107390/whats-the-difference-between-a-post-and-a-put-http-request, as accessed Dec. 9, 2014, (Sep. 20, 2008).

"Hypertext Transfer Protocol", http://en.wikipedia.org/wiki/Hypertext_Transfer_Protocol, as accessed Dec. 9, 2014, Wikipedia, (Oct. 8, 2005).

"What information appears in event logs? (Event Viewer)", http://windows.microsoft.com/en-us/windows/what-information-event-logs-event-viewer#1TC=windows-7, as accessed Dec. 9, 2014, Microsoft, (Dec. 15, 2013).

Michael Shavell, et al.; Method or Mechanism for Long Lived Connection Migration; U.S. Appl. No. 14/493,013, filed Sep. 22, 2014.

Michael Shavell, et al.; Method or mechanism for reduction in throughput for HTTP utilizing Long Polling with a distribution; U.S. Appl. No. 14/571,257, filed Dec. 15, 2014.

Keith Newstadt, et al; Systems and Methods for Consolidating Long-Polling Connections; U.S. Appl. No. 14/022,222, filed Sep. 10, 2013.

"XEP-0326: Internet of Things—Concentrators", http://xmpp.org/extensions/xep-0326.html, as accessed Jun. 29, 2013, (Jun. 14, 2013).

Michael Shavell, et al.; Systems and Methods for Sending Push Notifications That Include Preferred Data Center Routing Information; U.S. Appl. No. 14/868,324, filed Sep. 28, 2015.

Geraci, Austin, "GTM vs LTM—Difference between F5 Global & Local Traffic Manager", http://worldtechit.com/gtm-vs-ltm-difference-f5-global-local-traffic-manager/, as accessed Sep. 2, 2015, Worldtech IT, LLC, (Oct. 1, 2014).

* cited by examiner

SYSTEMS AND METHODS FOR PROTECTING NOTIFICATION MESSAGES

BACKGROUND

Many organizations operate notification services that update client devices with operating data, alerts, or other time-sensitive information. Since a notification service of this kind may service millions or tens of millions of clients, there is an incentive to communicate information as efficiently as possible to limit the bandwidth required. Another concern may be the security and integrity of the notification messages. Data transmitted over the Internet is inherently insecure and subject to man-in-the-middle attacks where messages are intercepted, modified, and then forwarded on to the intended recipient.

One approach to securing notification messages may be to use Secure Socket Layer (SSL) or Transport Layer Security (TLS), in which the client and server negotiate a secure connection using a handshaking procedure to agree on communication parameters and exchange encryption keys. Notification messages are then encrypted on the server and decrypted at each client. However, communicating over a secure connection in this way may introduce unacceptable increases in processing and bandwidth overhead. Accordingly, the instant disclosure identifies and addresses a need for additional and improved systems for protecting notification messages.

SUMMARY

As will be described in greater detail below, the instant disclosure describes various systems and methods for protecting notification messages by hashing all or part of a notification message, encrypting the hash, and adding the encrypted hash to the message. A client may determine whether the message has been modified during transmission by reversing the process—decrypting the encrypted hash, rehashing the hashed portion of the message, and comparing the two hash values. If the two values are equal, the client may be certain that the message originated with the message sender identified in the message and that the message was delivered unmodified.

In one example, a computer-implemented method for protecting notification messages may include (1) identifying at least a portion of a notification message to be protected from modification, (2) using a hash function to calculate a hash of the portion of the notification message, (3) encrypting the hash, (4) adding the encrypted hash to the notification message, and (5) transmitting the notification message to a client that is configured to verify that the portion of the message has not been modified by (a) decrypting the encrypted hash, (b) using the hash function to recalculate the hash of the portion of the notification message, and (c) verifying that the decrypted hash is the same as the recalculated hash.

In some examples, encrypting the hash may include encrypting the hash using a private signing key such that the encrypted hash is capable of being decrypted using a public verification key. In one embodiment, the public verification key may include a public key in a digital certificate. In some examples, adding the encrypted hash to the notification message may include adding the encrypted hash to a header of the notification message. In one embodiment, the portion of the notification message may include all of the notification message, including the header of the notification message and the encrypted hash. In one embodiment, the computer-implemented method may further include adding an additional header to the notification message and indicating in the additional header that the portion of the notification message protected from modification may include all of the notification message.

In one embodiment, the computer-implemented method may further include delimiting a beginning and end of the portion of the message protected from modification using sequences of at least one character. In one embodiment, the notification message may include at least one message field delimited by sequences of at least one character. In one embodiment, the notification message may include one or more message fields delimited by sequences of one or more characters. Identifying the portion of the notification message to be protected from modification may include identifying one or more message fields to be protected from modification. Calculating the hash of the portion of the notification message may include calculating the hash of the message field. In one embodiment, the computer-implemented method may further include identifying, in the header of the notification message, the message field protected from modification. In one embodiment, transmitting the notification message is performed by a server that transmits the notification message via a connection that was established in response to a long-polling request made by the client.

In one embodiment, a system for implementing the above-described method may include several modules stored in memory, such as (1) an identification module that identifies at least a portion of a notification message to be protected from modification, (2) a hashing module that uses a hash function to calculate a hash of the portion of the notification message, (3) an encryption module that encrypts the hash, (4) a messaging module that adds the encrypted hash to the notification message, and (5) a communication module that transmits the notification message to a client that is configured to verify that the portion of the message has not been modified by (a) decrypting the encrypted hash, (b) using the hash function to recalculate the hash of the portion of the notification message, and (c) verifying that the decrypted hash is the same as the recalculated hash. The system may also include at least one physical processor configured to execute the identification module, the hashing module, the encryption module, the messaging module, and the communication module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify at least a portion of a notification message to be protected from modification, (2) using a hash function, calculate a hash of the portion of the notification message, (3) encrypt the hash, (4) add the encrypted hash to the notification message, and (5) transmit the notification message to a client that is configured to verify that the portion of the message has not been modified by (a) decrypting the encrypted hash, (b) using the hash function to recalculate the hash of the portion of the notification message, and (c) verifying that the decrypted hash is the same as the recalculated hash.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
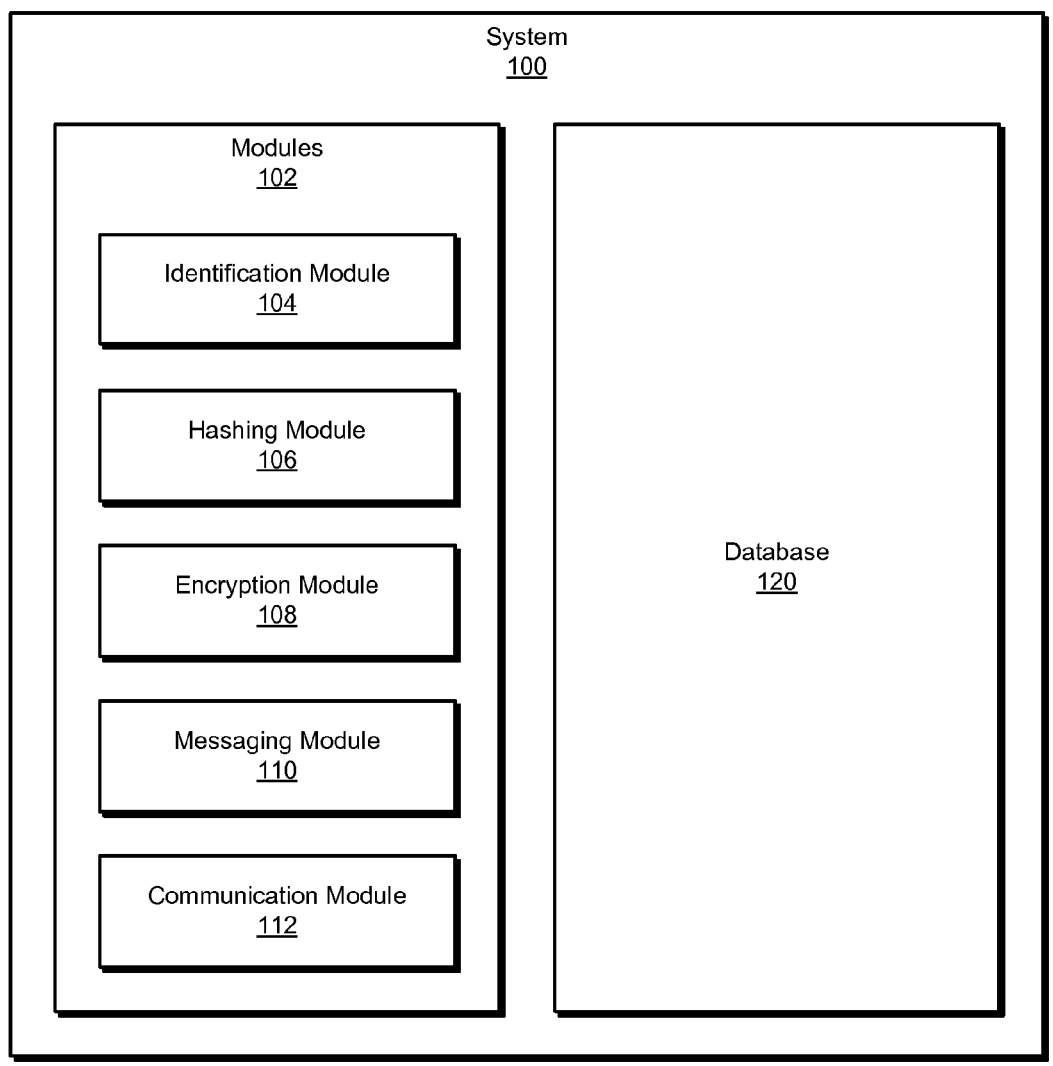
FIG. 1 is a block diagram of an exemplary system for protecting notification messages.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for protecting notification messages. As will be explained in greater detail below, systems and methods described herein may protect notification messages from modification by including an encrypted hash of a protected portion of the message within the message itself (for example, in a message header). Message recipients can use the encrypted hash to verify the identity of the sender and to determine whether the message was modified during transmission. Since only a small amount of data (a hash of one or more protected portions of the message) is encrypted, systems and methods described herein may involve less computational overhead than encrypting the entire message and/or performing the handshaking involved in establishing an SSL connection.

Figure 2:
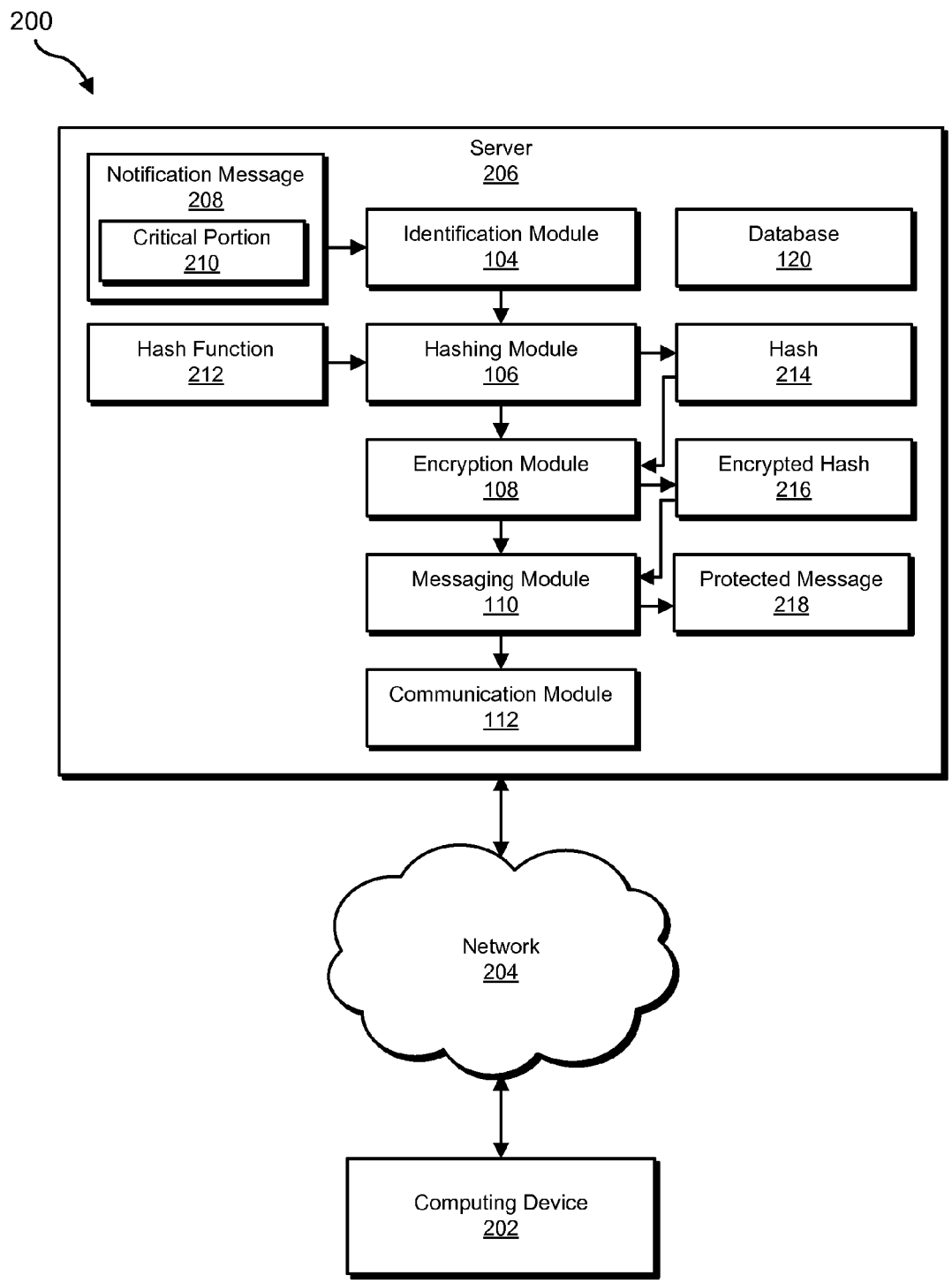
FIG. 2 is a block diagram of an additional exemplary system for protecting notification messages.
Figure 3:
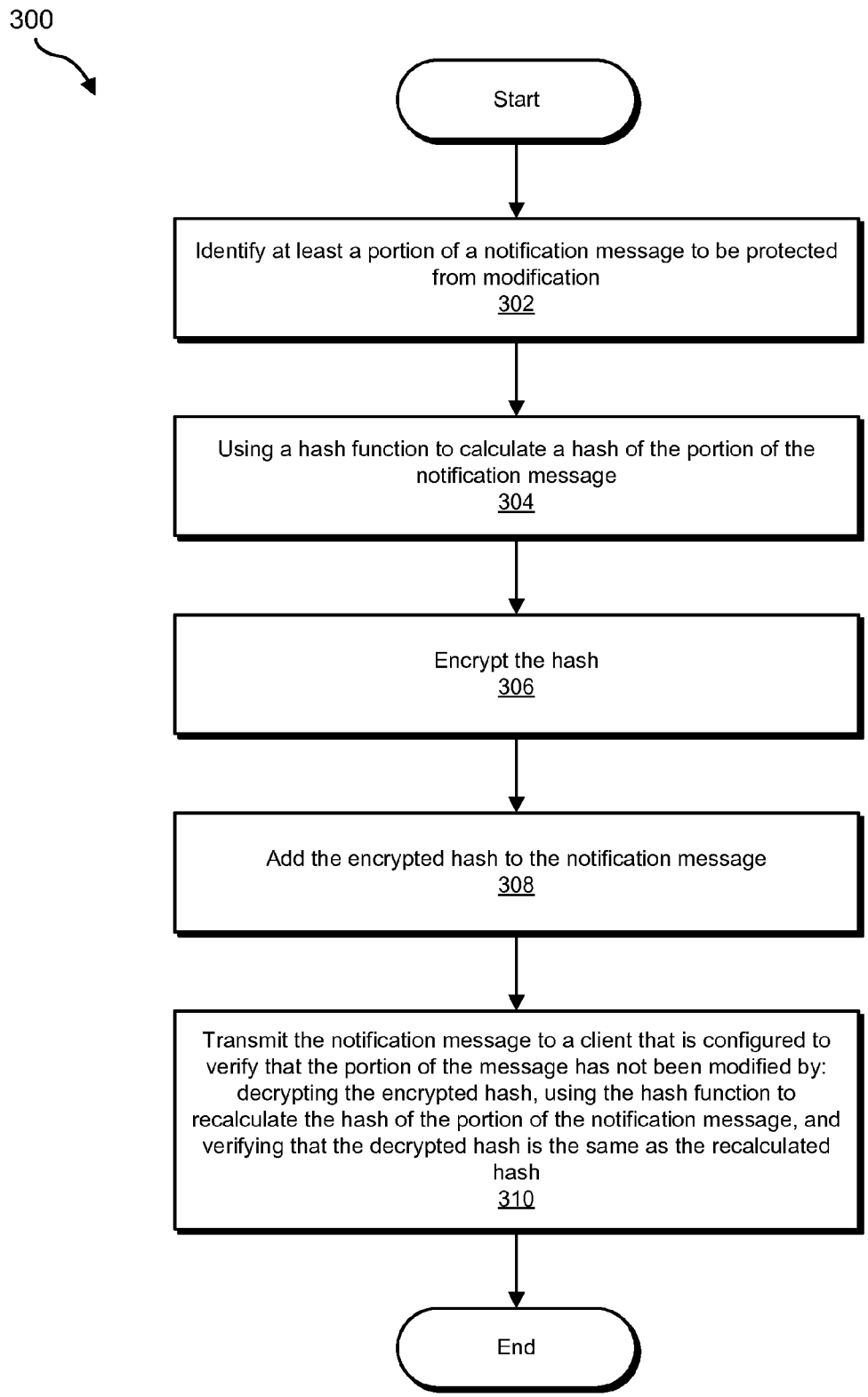
FIG. 3 is a flow diagram of an exemplary method for protecting notification messages.
Figure 4:
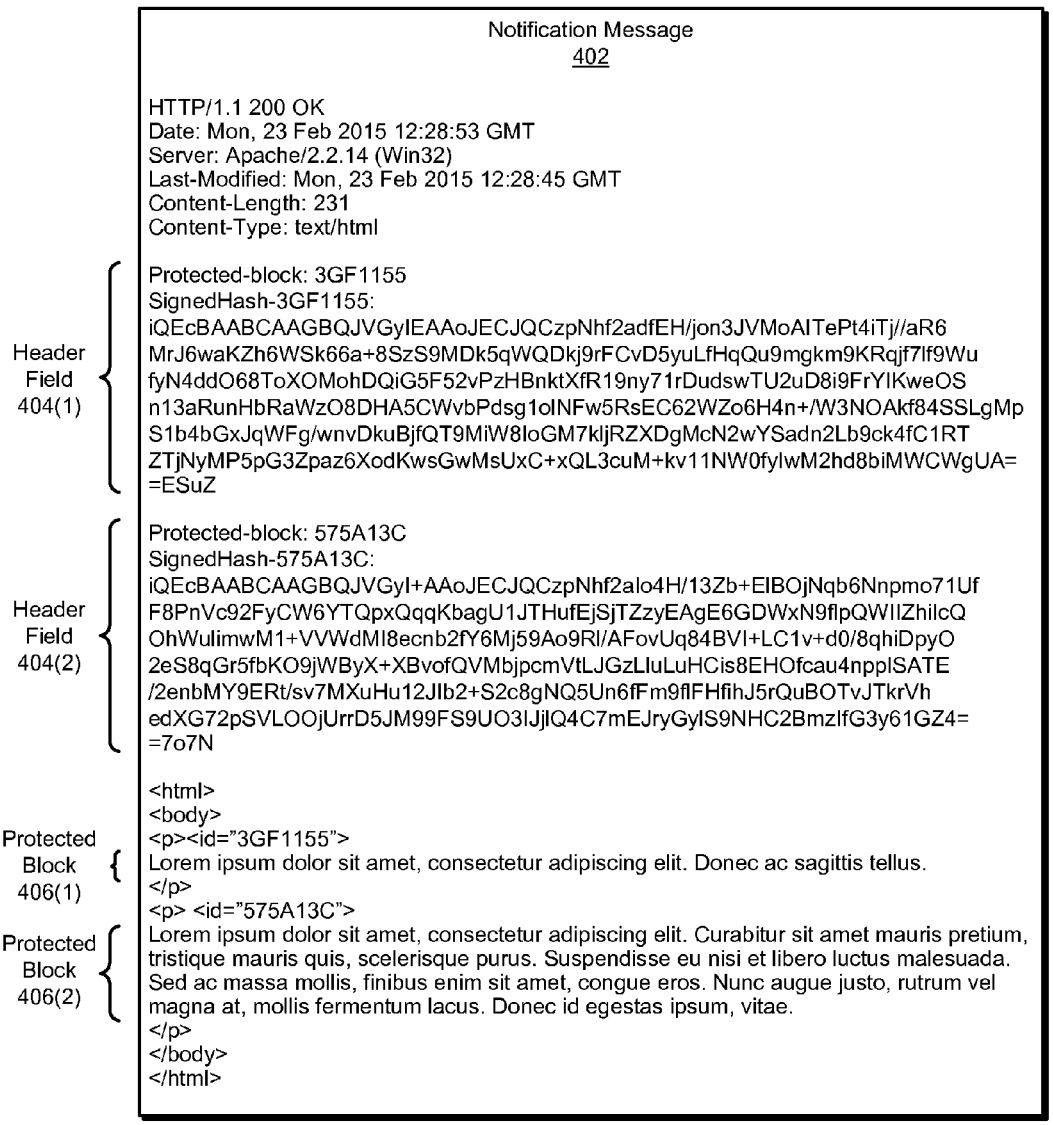
FIG. 4 is a block diagram of an exemplary notification message protected from modification.

The following will provide, with reference to FIGS. 1, 2, and 4, detailed descriptions of exemplary systems for protecting notification messages. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for protecting notification messages. As illustrated in this figure, exemplary system 100 may include one or more modules 102 for performing one or more tasks. For example, and as will be explained in greater detail below, exemplary system 100 may also include an identification module 104 that may identify at least a portion of a notification message to be protected from modification. Exemplary system 100 may additionally include a hashing module 106 that may use a hash function to calculate a hash of the portion of the notification message. Exemplary system 100 may also include an encryption module 108 that may encrypt the hash. Exemplary system 100 may additionally include a messaging module 110 that may add the encrypted hash to the notification message. Exemplary system 100 may also include a communication module 112 that may transmit the notification message to a client that may be configured to verify that the portion of the message has not been modified. After receiving the notification message, the client may verify that the message has not been modified by decrypting the encrypted hash, using the hash function to recalculate the hash of the portion of the notification message, and verifying that the decrypted hash may be the same as the recalculated hash. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store client data, such as system configuration information and/or client software version information. Exemplary system 100 may use such data to determine the content of information messages to be sent to client devices. Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to protect notification messages. For example, and as will be described in greater detail below, one or more of modules 102 may cause computing device 202 and/or server 206 to protect notification messages. In one example, computing device 202 may be a client of an information service or other cloud service provided by server 206. Computing device 202 may initiate a long-polling connection to server 206 by sending a request to server 206, to which server 206 may not immediately respond, instead maintaining a connection with computing device 202 for the purpose of sending one or more notification messages at a later time. For example, identification module 104 may identify at least a portion (e.g., a critical portion, as discussed in greater detail below) of a notification message 208 to be protected from modification.

Hashing module 106 may, using hash function 212, calculate hash 214 of a critical portion 210 of notification message 208. Encryption module 108 may encrypt hash 214 to produce encrypted hash 216. Messaging module 110 may add encrypted hash 216 to notification message 208 to produce protected message 218. Communication module 112 may transmit protected message 218 to computing device 202, which may be configured to verify that critical portion 210 of the message has not been modified by decrypting encrypted hash 216, using hash function 212 to recalculate hash 214 of critical portion 210 of protected message 218, and verifying that the decrypted hash is the same as the recalculated hash.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device that is capable of storing, comparing, and transmitting data. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for protecting notification messages. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302, one or more of the systems described herein may identify at least a portion of a notification message to be protected from modification. For example, identification module 104 may, as part of server 206 in FIG. 2, identify at least a portion of notification message 208 to be protected from modification. Identification module 104 may, for example, identify critical portion 210 as the portion of notification message 208 to be protected.

As used herein, the term "notification message" generally refers to messages a notification service sends to one or more clients that request information from the service. For example, an organization that provides computer security services may provide frequent and time-critical updates to agent programs running on client devices describing security threats, how to recognize the threats, how to protect the client device from the threats, and/or how to repair a compromised device. In another example, a server may provide software updates to a group of client devices. A notification service may distribute the same notification message to all clients or different notification messages to groups of one or more clients, according to the needs of the notification service. Notifications may include textual and/or binary data and use any suitable communication protocols and/or message formatting. For example, a server may transmit notification messages as Hypertext Transfer Protocol (HTTP) replies to HTTP requests received from client devices. Message data in the HTTP replies may, for example, be formatted using Hypertext Markup Language (HTML), Extensible Markup Language (XML), or GOOGLE PROTOCOL BUFFERS.

Identification module 104 may identify a portion of a notification message to be protected from modification in a variety of ways. For example, and as will be described in greater detail below, identification module 104 may protect an entire notification message from modification. In another example, identification module 104 may identify one or more blocks of data within a notification message to be protected from modification.

Identification module 104 may use various criteria for determining whether to protect the entire notification message or just a portion of the message, and if just a portion, which portions of the message to select for protection. For example, if an information service is to provide the same message to many clients, identification module 104 may determine that the entire message should be protected, since the message need only be hashed once for all recipients. In another example, if each notification message contains information unique to each recipient, identification module 104 may determine that only a small, critical portion of the message that contains the unique information should be protected, since hashing the entire message for each of many recipients may require an unacceptable amount of processing time. In another example, if the information service is providing a software update or software configuration information to client devices, identification module 104 may determine that the software update or software configuration information are critical portions of the message that should be protected from modification, since the data being transmitted may affect the operation or performance of recipient client devices.

At step 304, one or more of the systems described herein may use a hash function to calculate a hash of the portion of the notification message that is to be protected from modification. For example, hashing module 106 may, as part of server 206 in FIG. 2, use hash function 212, to calculate hash 214 of critical portion 210 of notification message 208.

The term "hash function," as used herein, generally refers to a one-way cryptographic function that, given a message of any length, produces a short, fixed-length value (typically a string of characters) called a "hash" or "hash value." A recipient of the message that includes the hash may use the same hash function to recalculate the hash for the message to verify that the provided hash correctly corresponds to the message. As will be described in greater detail below, knowing that the hash transmitted with the notification message is the hash that corresponds to the message may enable the recipient of the message verify that the message was not modified during transmission. Hashing module 106 may calculate a hash of the portion of the notification message in a variety of ways. For example, hashing module 106 may use cryptographic hash functions such as MD5, SHA1, or SHA256.

At step 306, one or more of the systems described herein may encrypt the hash. For example, encryption module 108 may, as part of server 206 in FIG. 2, encrypt hash 214 to produce encrypted hash 216. As will be described in greater detail below, encrypting the hash may enable the recipient of the notification message to verify the identity of the sender and that the hash was not modified during transmission. If the hash was not modified and the included hash correctly corresponds to the hashed portion of the message, then the recipient may be assured that the message was not modified during transmission.

Encryption module 108 may encrypt the hash value in a variety of ways. For example, encryption module 108, using public-key (also known as asymmetric key) cryptography, may encrypt the hash using a private signing key, so that the encrypted hash may be decrypted using a public verification key. The phrases "signing key" and "verification key," as used herein, generally refer to paired keys in a public key encryption scheme in which the sender may use a private signing key to encrypt data, and a recipient of the data may then use a publicly available key to decrypt the data and verify the identity of the sender. If the sender has kept the signing key private, the recipient may be assured that the data was signed by the sender.

In one embodiment, the public verification key may include a public key in a digital certificate. The term "digital certificate," as used herein, generally refers to an electronic document that binds a public key to the identity of a person or organization. The recipient of a notification message may obtain a digital certificate containing the public verification key from the sender of the message or from a certificate authority that issued the certificate.

In one embodiment, encryption module 108 may use symmetric key cryptography to encrypt the hash using an encryption/decryption key. In symmetric key cryptography, the recipient decrypts the encrypted message (the encrypted hash) using the same key used to encrypt the message (or with a key that can be derived from the encryption key in an easily computable way). The security of symmetric key cryptography depends on both the sender and recipient of the message protecting the encryption/decryption key from disclosure.

At step 308, one or more of the systems described herein may add the encrypted hash to the notification message. For example, messaging module 110 may, as part of server 206 in FIG. 2, add encrypted hash 216 to notification message 208 to create protected message 218.

Messaging module 110 may add the encrypted hash to the notification message in a variety of ways. For example, messaging module 110 may add the encrypted hash to the notification message by adding the encrypted hash to a header of the notification message, as shown in FIG. 4. FIG. 4 is a block diagram of an exemplary notification message 400 protected from modification. Notification message 402 is formatted as an HTTP reply with the body of the message formatted as an HTML document. Notification message 402 may include header field 404(1), which identifies protected block 406(1) as a portion of the message that has been protected from modification. Header field 404(1) identifies the protected block as the portion of the message marked with an ID value of "3GF1155," and includes an encrypted MD5 hash value (identified as "SignedHash-3GF1155") for the protected block.

In other examples, messaging module 110 may add the encrypted hash as a metadata tag on an HTML message, as an attribute of an XML element, as an attribute to an HTML or XML tag at the beginning of a protected block of data, as a comment in any structured data format, or in any other suitable form.

In one embodiment, messaging module 110 may, using sequences of at least one character, delimit the beginning and end of the portion of the message protected from modification. For example, as shown in FIG. 4, protected block 406(1) is a paragraph in an HTML document, delimited by HTML tags '<p><id="3GF1155">' at the beginning of the paragraph block and "</p>" at the end.

In some examples, systems and methods described herein may protect one or more fields of a message from modification. For example, identification module 104 may identify one or more blocks of data in messages formatted using HTML, XML, or other structured document formats. After identification module 104 identifies the blocks of data to be protected from modification, hashing module 106 may calculate the hashes of the message fields, and encryption module 108 may encrypt the hashes. Messaging module 110 may then identify, in the header of the notification message, the message fields protected from modification. For example, as shown in FIG. 4, messaging module 110 may identify, in the message header, multiple fields of the notification message that have been protected from modification. As shown, exemplary notification message 402 includes two protected blocks, protected block 406(1) and protected block 406(2). Messaging module 110 indicates the presence of the two protected blocks using header field 404(1) and header field 404(2), which identify the protected blocks by providing their IDs, "3GF1155" and "575A13C." Header fields 404(1) and 404(2) also include encrypted hash values for the two protected blocks, so the recipient may verify that the contents of the two protected blocks have not been modified.

In one embodiment, the portion of the notification message that is protected from modification may include the entire message, including the header of the notification message and the encrypted hash. To protect the entire message, messaging module 110 may add an additional header to the notification message and indicate in the added header that the portion of the notification message protected from modification includes the entire message. Messaging module 110 may or may not delimit the portion of the message that has been protected from modification, since the recipient may recognize that the protected portion of the message includes everything after the added header.

Returning to FIG. 3, at step 310, one or more of the systems described herein may transmit the notification message to a client that is configured to verify that the portion of the message has not been modified by decrypting the encrypted hash, using the hash function to recalculate the hash of the portion of the notification message, and verifying that the decrypted hash is the same as the recalculated hash. For example, communication module 112 may, as part of server 206 in FIG. 2, transmit protected message 218 to computing device 202, which may be configured to verify that critical portion 210 of protected message 218 has not been modified. Computing device 202 may verify that the protected portion of protected message 218 has not been modified by decrypting the encrypted hash for the protected portion, using the hash function to recalculate the hash of the portion of the notification message, and verifying that the decrypted hash is the same as the recalculated hash.

Returning to FIG. 4, upon receiving the protected message, the client may identify the protected portions of the notification message by obtaining the IDs of the protected blocks from header fields 404(1) and 404(2). For each of the protected blocks, the client may decrypt the corresponding encrypted hash value in the SignedHash field using the sender's public key. The message recipient may then recalculate the hash for protected blocks 406(1) and 406(2) using the same hash function the sender used to calculate the hash values sent in encrypted form in the message header. If the recalculated hash values are the same as the decrypted values, the message recipient may be assured that the message was not modified during transmission. The matching recalculated and decrypted hash values may also verify the identity of the message sender, since the encrypted hash included in the message may only be decrypted by the public key corresponding to the private key the sender used to encrypt the hash.

Communication module 112 may transmit the protected notification message in a variety of ways. In one embodiment, communication module 112 may transmit protected message 218 via a connection that was established in response to a long-polling request made by a client such as computing device 202.

As used herein, the phrase "long-polling connection" generally refers to a style of network communication in which a client polls a network service for information. If no information is available, rather than returning an empty response, the network service may wait until information is available to respond to the client, or until a timeout event occurs. Long-polling connections may be used to emulate push technology, where data is pushed to clients from a network service, but where true push communication may not be possible or practical. In one example, a long-polling connection may include an HTTP request that establishes a connection when the server does not immediately reply to the request and close the connection.

In another example, communication module 112 may transmit the protected message in response to a polling request from a client. For example, computing device 202 may poll server 206 periodically to determine whether a notification message is available. In other examples, communication module 112 may use HTTP streaming, ADOBE FLASH XML socket relays, or any other suitable protocol for establishing connections for transmitting messages to clients.

As explained in connection with exemplary method 300 above, systems and methods described herein may protect notification messages by adding to the message an encrypted hash of a protected portion of the notification message. Systems and methods described herein may protect all or a portion of a notification message, and notification messages may include text or binary data in a variety of formats. Systems and methods described herein may protect the integrity of notification messages without adding as much computational or communication overhead as methods that encrypt the entire message or require extensive handshaking to establish a secure connection, as with SSL.

Figure 5:
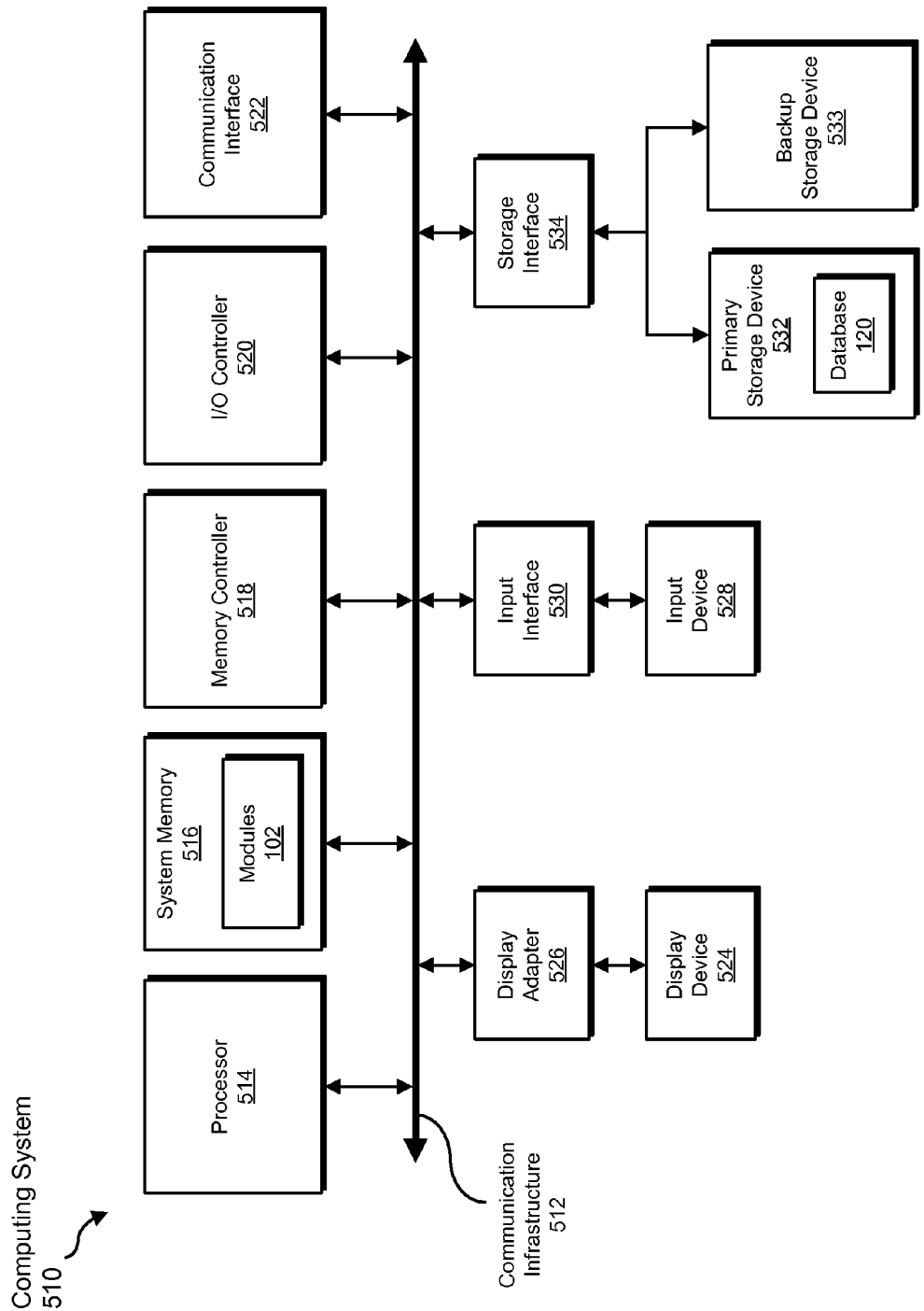
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
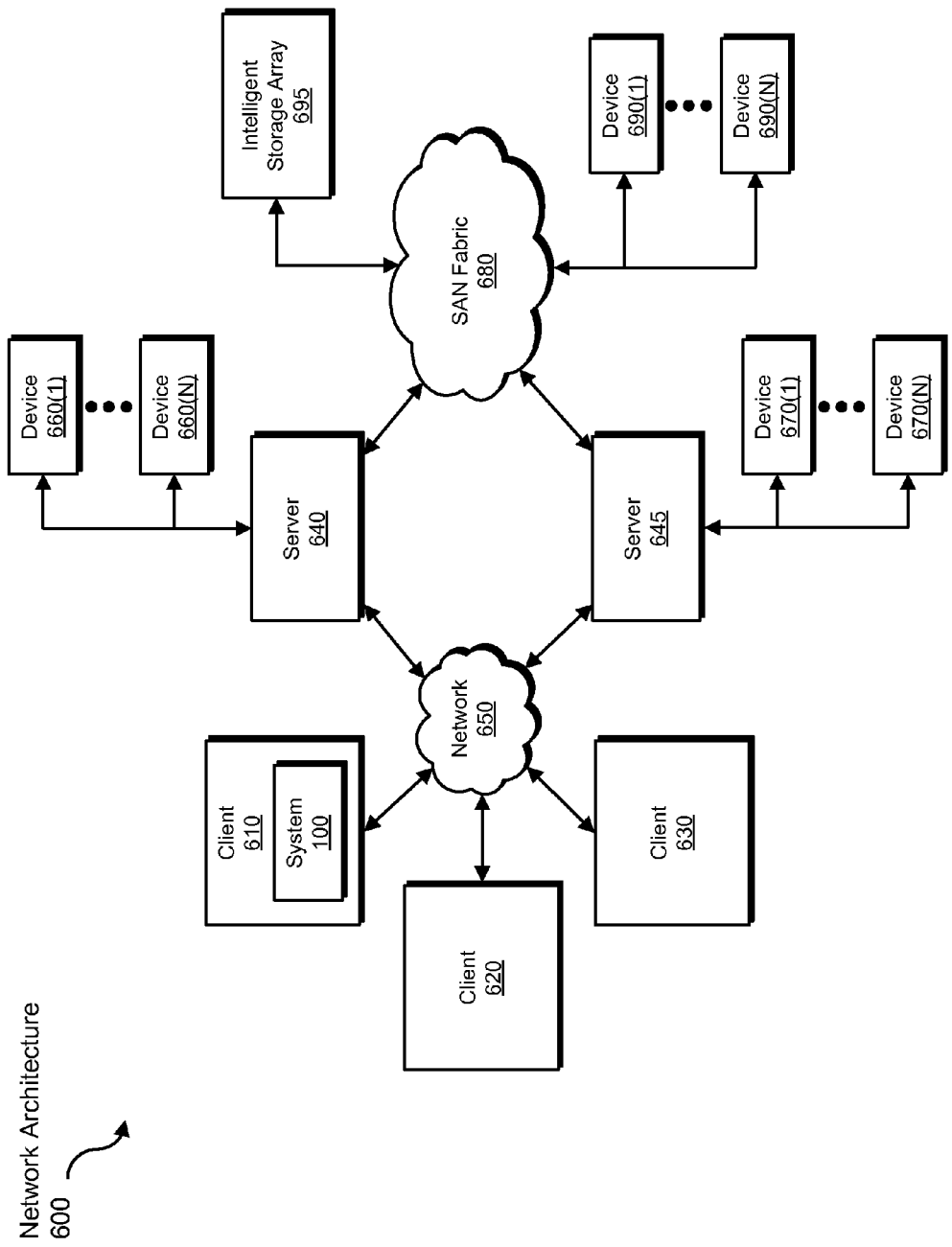
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for protecting notification messages.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multitenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive notification messages to be transformed, transform the notification messages to identify at least a portion of the notification messages to be protected, output a result of the transformation to calculate encrypted hashes of the portions to be protected, use the result of the transformation to create protected notification messages, and store the result of the transformation to provide a mechanism to verify that the protected messages have not been modified. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting notification messages, at least a portion of the method being performed by a computing device comprising at least one processor, the method comprising:
   identifying at least a portion of a notification message that is to be:
     protected from modification; and
     transmitted to a client via an unsecured network connection;
   using a hash function to calculate a hash of the portion of the notification message;
   encrypting the hash;

adding the encrypted hash to a header of the notification message;

delimiting the portion of the notification message by:

inserting, within a body of the notification message, predetermined sequences of at least one character at a beginning and an end of the portion of the notification message; and inserting, within the header of the notification message, a protected block identifier that identifies the predetermined sequences inserted into the body of the notification message; and transmitting the notification message to the client via the unsecured network connection, where the client verifies that the portion of the notification message has not been modified by:

decrypting the encrypted hash;

identifying the portion of the notification message based on the protected block identifier and the predetermined sequences inserted into the notification message;

using the hash function to recalculate the hash of the portion of the notification message; and verifying that the decrypted hash is the same as the recalculated hash.

2. The computer-implemented method of claim 1, wherein encrypting the hash comprises encrypting the hash using a private signing key such that the encrypted hash is capable of being decrypted using a public verification key.

3. The computer-implemented method of claim 2, wherein the public verification key comprises a public key in a digital certificate.

4. The computer-implemented method of claim 1, wherein adding the encrypted hash to the header of the notification message comprises adding the encrypted hash to a predetermined field within the header of the notification message.

5. The computer-implemented method of claim 4, wherein:

the portion of the notification message comprises all of the notification message, including the header of the notification message; and the computer-implemented method further comprises:

adding an additional header to the notification message; and indicating in the additional header that the portion of the notification message protected from modification comprises all of the notification message.

6. The computer-implemented method of claim 1, wherein the predetermined sequences inserted at the beginning and the end of the portion of the notification message comprise HyperText Markup Language (HTML) tags.

7. The computer-implemented method of claim 1, wherein transmitting the notification message is performed by a server that transmits the notification message via the unsecured network connection after establishing the unsecured network connection in response to a long-polling request made by the client.

8. The method of claim 1, wherein identifying the portion of the notification message that is to be protected from modification comprises identifying a critical portion of the notification message that contains information relevant to the performance of the client.

9. The method of claim 8, wherein the critical portion of the notification message indicates at least one of:

an available software update for the client; and configuration information about software running on the client.

10. A system for protecting notification messages, the system comprising:

an identification module, stored in memory, that identifies at least a portion of a notification message that is to be:

protected from modification; and transmitted to a client via an unsecured network connection;

a hashing module, stored in memory, that uses a hash function to calculate a hash of the portion of the notification message;

an encryption module, stored in memory, that encrypts the hash;

a messaging module, stored in memory, that:

adds the encrypted hash to a header of the notification message; and delimits the portion of the notification message by:

inserting, within a body of the notification message, predetermined sequences of at least one character at a beginning and an end of the portion of the notification message; and inserting, within the header of the notification message, a protected block identifier that identifies the predetermined sequences inserted into the body of the notification message;

a communication module, stored in memory, that transmits the notification message to the client via the unsecured network connection, where the client verifies that the portion of the notification message has not been modified by:

decrypting the encrypted hash;

identifying the portion of the notification message based on the protected block identifier and the predetermined sequences inserted into the notification message;

using the hash function to recalculate the hash of the portion of the notification message; and verifying that the decrypted hash is the same as the recalculated hash; and at least one physical processor configured to execute the identification module, the hashing module, the encryption module, the messaging module, and the communication module.

11. The system of claim 10, wherein the encryption module encrypts the hash by encrypting the hash using a private signing key such that the encrypted hash is capable of being decrypted using a public verification key.

12. The system of claim 11, wherein the public verification key comprises a public key in a digital certificate.

13. The system of claim 10, wherein the messaging module adds the encrypted hash to the header of the notification message by adding the encrypted hash to a predetermined field within the header of the notification message.

14. The system of claim 13, wherein:

the portion of the notification message comprises all of the notification message, including the header of the notification message;

the messaging module adds an additional header to the notification message; and the messaging module indicates in the additional header that the portion of the notification message protected from modification comprises all of the notification message.

15. The system of claim 10, wherein the predetermined sequences inserted at the beginning and the end of the portion of the notification message comprise HTML tags.

16. The system of claim 10, wherein transmitting the notification message is performed by a server that transmits the notification message via the unsecured network connection after establishing the unsecured network connection in response to a long-polling request made by the client.

17. A non-transitory computer-readable medium comprising one or more computer-readable instructions that, when executed by at least one processor of a computing device, cause the computing device to:
- identify at least a portion of a notification message that is to be:
  - protected from modification; and
  - transmitted to a client via an unsecured network connection;
- use a hash function to calculate a hash of the portion of the notification message;
- encrypt the hash;
- add the encrypted hash to a header of the notification message;
- delimit the portion of the notification message by:
  - inserting, within a body of the notification message, predetermined sequences of at least one character at a beginning and an end of the portion of the notification message; and
  - inserting, within the header of the notification message, a protected block identifier that identifies the predetermined sequences inserted into the body of the notification message; and
- transmit the notification message to the client via the unsecured network connection, where the client verifies that the portion of the notification message has not been modified by:
  - decrypting the encrypted hash;
  - identifying the portion of the notification message based on the protected block identifier and the predetermined sequences inserted into the notification message;
  - using the hash function to recalculate the hash of the portion of the notification message; and
  - verifying that the decrypted hash is the same as the recalculated hash.

18. The non-transitory computer-readable medium of claim 17, wherein the one or more computer-readable instructions cause the computing device to encrypt the hash using a private signing key such that the encrypted hash is capable of being decrypted using a public verification key.

* * * * *